United States Patent [19]

Neal

[11] Patent Number: 5,267,813
[45] Date of Patent: Dec. 7, 1993

[54] OIL CONTAINMENT CURTAIN

[75] Inventor: James H. Neal, Winston-Salem, N.C.

[73] Assignee: O.S.C.A.R. International, Winston-Salem, N.C.

[21] Appl. No.: 930,764

[22] Filed: Aug. 14, 1992

[51] Int. Cl.⁵ .............................................. E02B 15/06
[52] U.S. Cl. ....................................... 405/72; 405/63; 405/67
[58] Field of Search ....................... 405/63, 66, 67, 72; 210/923

[56] References Cited

U.S. PATENT DOCUMENTS

| | | | |
|---|---|---|---|
| 3,613,376 | 10/1971 | Midby | 405/66 |
| 3,764,015 | 10/1973 | Rolfson | 210/242 |
| 3,807,177 | 4/1974 | Oberg | 405/66 |
| 3,852,978 | 12/1974 | Fossberg | 405/67 |
| 3,888,086 | 6/1975 | Robertson | 405/22 |
| 3,921,407 | 11/1975 | Neal | 61/1 |
| 4,116,833 | 9/1978 | Stagemeyer | 210/83 |
| 4,248,547 | 2/1981 | Brown | 405/72 |
| 4,333,726 | 6/1982 | Fuxelius | 405/72 |
| 5,102,262 | 4/1992 | Brown | 405/70 |

Primary Examiner—David H. Corbin
Attorney, Agent, or Firm—Rhodes, Coates & Bennett

[57] ABSTRACT

Flotation spars are detachably connected along the length of an oil containment curtain to insure the verticality of a floating containment boom. Spaced tubular sleeves extend vertically along one side of each band. The sleeves are so configured as to pivotally or hingedly mount the flotation spar to the curtain in such a manner as to permit a free pivotal action of the sleeve and spar with respect to the face of the curtain. The flotation spar is also secured to the sleeve by a pair of locking tabs that extend upwardly from the top edge of the sleeve. A cap slides over the top end of the spar and fixes the locking tabs between the cap and spar wall.

16 Claims, 1 Drawing Sheet

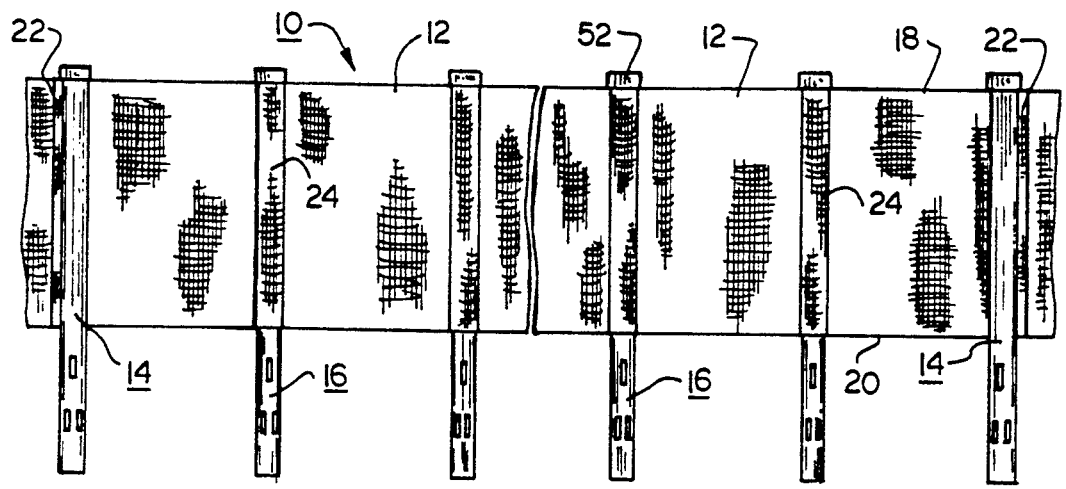
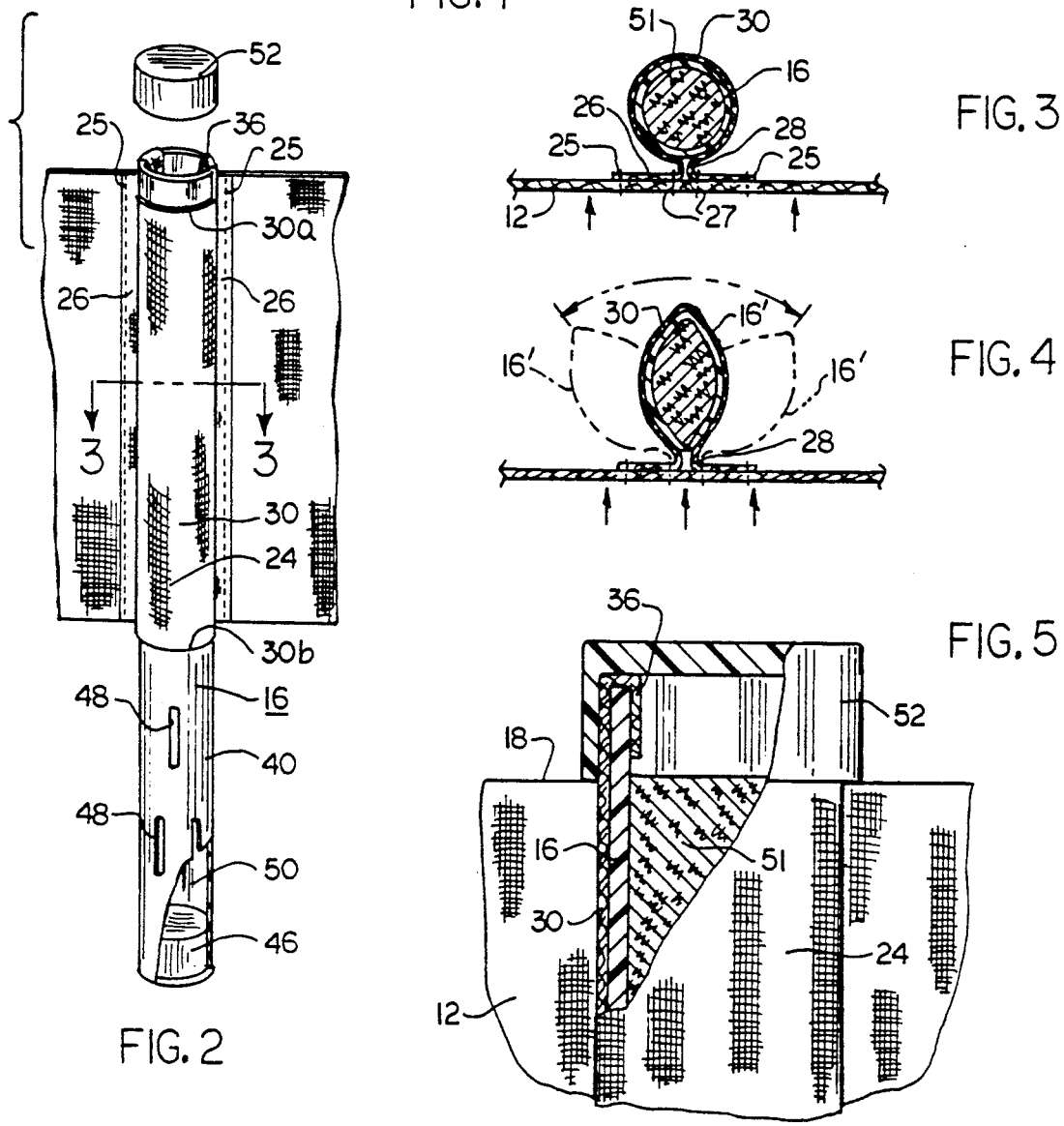
FIG. 1
FIG. 2
FIG. 3
FIG. 4
FIG. 5

OIL CONTAINMENT CURTAIN

FIELD OF INVENTION

The present invention is related to curtains for containing an oil spill on a body of water, and more particularly, to a curtain having detachable and pivotally mounted flotation spars.

BACKGROUND OF THE INVENTION

Oil spills and releases of other water-borne pollutants can potentially result in grave environmental damage and health concerns. To help mitigate the adverse consequences of aquatic spills, oil containment booms or fences are used to isolate aquatic spills so that water-borne pollutants can be removed from the water.

Oil-containment booms include water-permeable, oil-impermeable curtains or bands connected together by connector spars to form an oil-containing wall. When placed in the water at an oil spill, booms are designed to assume and maintain a partially submerged, vertical position to contain oil floating on the surface of the water. Changing currents within the water, however, exert forces on the boom tending to rotate a boom to a position in which the bands or curtains are no longer vertical. This allows oil and other pollutants to escape the boom therebeneath.

Elongated flotation spars are connected to the surface of the curtains of a boom at points between the connecting spars to ensure that the boom maintains a generally vertical position in the water. Several different prior art booms with flotation spars connected along a side of the boom are disclosed by U.S. Pat. No. 3,764,015, issued Oct. 9, 1973; U.S. Pat. No. 4,116,833, issued Sep. 26, 1978; U.S. Pat. No. 4,333,726, issued Jun. 8, 1982; U.S. Pat. No. 4,248,547, issued Feb. 3, 1981; and U.S. Pat. No. 5,102,262, issued Apr. 7, 1992.

One problem with the above-identified and other known prior art booms is that the connections between the boom's bands and flotation spars do not allow for easy and secure replacement of a defective flotation spar. Adverse conditions during the containment operation may result in a flotation spar becoming damaged so that it no longer performs its function of maintaining the boom in a vertical position. Replacement of a damaged spar is necessary to prevent the spar from becoming a burden to the boom. Prior art booms, however, have flotation spars that are either fixedly attached to the containment band by a relatively complicated securement technique or else are not securely emplaced. As such, prior techniques do not provide effective spar attachments that also allow for easy replacement of a damaged spar.

A second problem arises as a result of the movement of water relative to the boom tending to lift the curtain which allows oil to escape therebeneath. Where the spars are relatively fixed with respect to the curtains, the spar itself may actually help create the drag that lifts the boom. As water speeds increase to 3 or 4 knots per hour, this problem may become more severe.

SUMMARY AND OBJECTS OF THE INVENTION

The boom of the present invention is generally of the type including a series of mesh bands connected together by connecting spars to form an oil-containing wall. Flotation spars are connected at spaced intervals along the sides of the bands between the connecting spars to cause the boom to assume a vertical position when placed in the water. The flotation spars are connected to the band's sides by a hinged sleeve that securely mount the flotation spars, allow the flotation spars to be easily replaced during use of the boom, and also allow the flotation spars to pivot in alignment with the water current.

Each spar connector is formed by a spar sleeve extending vertically along the side of a band. The spar sleeve includes a tubular section of fabric or polymer sheet material sewn or stitched to the fabric band and sized to snugly or closely fit around substantially the entire periphery of a flotation spar extending through the tubular section. The frictional engagement caused by the snug fit around substantially the entire periphery of the spar casing prevents inadvertent slippage or dislodgement of the spar during usage. The tubular section of the sleeve has an open top end and open bottom end that allow for easy replacement of a damaged spar during the containment process without jeopardizing the boom's ability to contain an oil spill.

The flotation spars are detachably fixed within the sleeves by the snug fit between a sleeve and an inserted spar and, in addition, by an auxiliary locking mechanism. The auxiliary locking mechanism includes a pair of spaced locking tabs extending upwards from the top edge of the spar sleeve. The locking tabs are used to fixedly attach a flotation spar to a sleeve by sliding a spar cap over the top end of a flotation spar such that the locking tab is sandwiched between the lock-on cap and the wall of the spar.

The tubular section of each sleeve is connected to a band's side by a pair of closely adjacent seams. The closely adjacent seams form a sleeve joint that pivotally or hingedly attaches the tubular section and inserted spar to the side of a band. Because of the hinged attachment of the spar to the band's surface, an attached spar has a range of movement that allows the spar to swing back and forth along one side of the band. The range of movement of the spar urges the spars to reorient themselves in alignment with the current in response to the water current engaging the boom. This is particularly evident in the case of a flotation spar having an oval or oblong cross-section. The ability of the flotation spars to reposition or reorient themselves according to the direction of the current tends to cause the boom to remain upright.

Accordingly, it is an object of the present invention to provide an oil containment curtain with quickly detachable flotation spars.

Another object of the present invention is to provide a curtain of the type described with flotation spars that are both quickly detachable, but securely connected to the surface of the oil-containing bands.

Another object of the present invention is to provide a curtain of the type described with flotation spars that are pivotable with respect to the surface of the curtain to allow the spars to be positioned in the direction of the water current.

Other objects and advantages of the present invention will become apparent and obvious from a study of the following description and the accompanying drawings which are merely illustrative of such invention.

BRIEF DESCRIPTION OF THE DRAWINGS

FIG. 1 is a front elevational view of a portion of an oil containment curtain having flotation spars of the present invention;

FIG. 2 is a front perspective view, with the locking cap exploded away, of a section of the curtain of the FIG. 1 showing a spar sleeve with an inserted flotation spar;

FIG. 3 is a sectional view taken substantially along lines 3—3 of FIG. 2;

FIG. 4 is a sectional view similar to FIG. 3, except showing an alternative view of a spar having an oblong or oval cross-section and its arc of travel for alignment with the current; and FIG. 5 is a side elevational view of a spar with a portion cutaway showing the connection between a locking tab and the spar.

DETAILED DESCRIPTION OF THE INVENTION

Referring to the drawings, a portion of the oil containment curtain of the present invention is indicated generally by the numeral 10. Boom 10, as shown in FIG. 1, includes mesh curtains or bands 12 attached together by connector spars 14 to form an oil-containing fence. Each band ranges in length from 25-50 feet and therefore must be provided with intermediate flotation spars 16. Connected at spaced intervals along the downstream sides of each band 12 are the flotation spars 16 that cause boom 10 to assume a vertical, partially-submerged position when placed in the water.

Each band 12 has a top edge 18, a bottom edge 20 and enlarged side ends 22 that attach to a pair of spaced connector spars 14. Bands 12 are constructed of a water-permeable, oil-permeable material. Several such materials suitable for bands 12 are commercially available. One preferred yarn used to construct fabric bands 12 is formed of long chain expanded polyethylene fibers sold under the trademark Spectra (trademark of Allied Signal). Other suitable materials for bands 12 are disclosed in U.S. Pat. No. 3,921,407, issued Nov. 25, 1975 (herein incorporated by reference). Such fabrics often consist of a close weave which defines small apertures or pores through which water will pass but which are too small to permit the passage of oil.

Extending vertically from the top edge 18 to the bottom edge 20 of bands 12 are spaced flotation spar receiving sleeves 24. Sleeves 24 are constructed from any suitable material, even the same material as band 12 and provide a spar-connection means to detachably and pivotally connect flotation spars 16 to the surface of a band 12. As shown in FIGS. 2 and 3, fabric sleeve 24 is formed of generally rectangular fabric sheet having opposed side marginal portions and a central main portion. The side portions are arranged in close proximity to each other and, when seamed, form the tubular section 30 from the central main portion. The side portions then become flanges 26. So formed, sleeve 24 includes a pair of attachment flanges 26, a neck 28, and a tubular section 30 having an open top end 32 and an open bottom end 34. Connection flanges 26 are each stitched to the fabric band 12 along parallel seams 25,27. Seams 27 are close together, so that the tubular section surrounds substantially the entire periphery of the spar 16. Tubular section 30 is sized to closely fit a flotation spar 16. The upper and lower ends of spar 16 extend through open top end 30a and beyond open bottom end 30b of tubular section 30. The close fit between the sleeve's tubular section 30 and an inserted spar 16 helps hold spar 16 within tubular section 30. Attached to a top edge 32a of tubular section 30 on opposite sides thereof are a pair of upwardly extending locking tabs 36. As will be discussed below, tabs 36 cooperate with cap 32 and the casing of spar 16 to form an auxiliary locking mechanism to further secure spar sleeve 24 to spar 16.

The short fabric sections or necks 28 hingedly connect the tubular section 30 and inserted spar 16 to the surface of band 12. The coupling of the tubular section 30 to the side of band 12 through sleeve neck 28 enables an attached spar 16 to move back and forth (FIG. 3) with respect to the surface of band 12.

Each flotation spar 16 is formed by an elongated cylindrical casing 40 having a top end 42 and a bottom end 44. The lower section of casing 40 includes a weighted bottom 46 and apertures 48 leading to a ballast chamber 50. The upper section of spar 16 includes a buoyant material 51, such as polymeric foam, located within casing 40 to provide buoyancy to the flotation spars 16. Spars 16 have buoyancy characteristics that cause spars 16 and the connected bands 12 to assume a vertical position when placed in the water. U.S. Pat. No. 3,921,407, issued Nov. 25, 1975, discloses a spar which can be used as a flotation spar 16.

The close fit between a spar sleeve 30 and a spar 16 substantially secure the spars 16 within the spar sleeves 30. In addition, a spar cap 52 and the locking tabs 36 work together to provide an auxiliary means for securing a spar 16 to a sleeve 30. As shown in FIG. 5, when spar 16 is inserted in sleeve 30 the locking tabs 36 extend upwardly and over the top edge of spar 16 and into a top hollow section 54 of spar 16. As shown in FIG. 5, spar cap 52 then slides over the top end 42 of spar 16 to sandwich the locking tabs 36 between spar cap 52 and spar 16 so as to secure sleeve 30 to spar 16.

In FIG. 4, there is illustrated an alternate embodiment in which the cross-section of spar 16' is oval or oblong, rather than circular as in FIG. 3. The oval configuration will cause the flotation spars to align themselves with the current even more to further reduce drag. The arc of travel is best illustrated in FIG. 4.

Connector spars 14 connect adjacent bands 12 together to form an oil-containing wall of a selected length. Connector spars 14 are designed in a similar manner as flotation spars 16, but include a band-spar connection capable of connecting two adjacent bands end-to-end. There are several suitable connector spars disclosed in the prior art. U.S. Pat. No. 3,921,407, issued Nov. 25, 1975 discloses one preferred embodiment of the connector spar 14. Another is disclosed in applicant's copending application, U.S. Ser. No. 930,852 filed Aug. 14, 1992.

Boom 10 is used and operates as follows to isolate an oil spill. The boom 10 is placed in the water at the site of an oil spill. The flotation spars 16 attached at spaced intervals along bands 12 cause the boom 10 to assume a vertical, partially-submerged position in the water. The oil-containing boom 10 is then positioned to encircle and isolate the oil spill.

Because the flotation spars 16 are hingedly connected to the sides of bands 12, the force of the current (direction of arrows in FIGS. 3 and 4) affects the positioning of the spars 16. The direction of the current is not always perpendicular to the surface of band 12. For example, as the boom 10 is towed, it assumes a curved or even U-shape. In such a configuration, the direction of the current will be at various angles with respect to the surface of the boom. The impact of the current on each flotation spar 16 causes the tubular section 30 of spar sleeve 24 and inserted spar 16 to pivot at sleeve neck 28 and swing to align itself in the direction of the water current. Positioning of the spars 16 in the direction of the water current helps reduce the drag that would be exerted on the boom by the spars.

During use of boom 10, a spar 16 may become a hindrance to the efficient boom 10 if damaged. Also a curtain or band 12 may become damaged. The design of spar sleeve 24 allows for replacement of a damaged spar 16 or a torn or clogged band 12 without serious interruption to the oil-containment process. To replace a damaged spar 16 or band 12, spar cap 58 is slid off the top end 42 spar 16 to release the connection between locking tabs 36 and spar 16. Because the top end 30a of the sleeve's tubular section 30 is open, damaged spar 16 can be manually pulled and removed from sleeve 24.

A replacement spar 16 can then be manually inserted in empty sleeve 24 to repair boom 10. Replacement spar 16 slides through the open top end 30a and beyond open bottom end 30b so as to position spar 16 within sleeve 24. Locking tabs 36 are then extended along the sides of spar 16 and into hollow section 54. Spar cap 52 slides over the locking tab 36 and onto the top end 42 of spar 16 to connect spar 16 to sleeve 24. Once spar cap 52 is positioned onto spar 16, replacement spar 16 is properly connected to band 12 and the boom 10 is in a repaired state.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A curtain section for an oil-containment boom comprising:
    (a) a water-permeable, oil-impermeable fabric band with two ends, a top edge, and a bottom edge;
    (b) at least one spar receiving sleeve disposed between said two side ends and on at least one surface of said band;
    (c) said spar receiving sleeve including generally rectangular fabric having opposed side marginal portions and a central main portion, said side portions arranged in close proximity to each other and seamed to said fabric band to form a tubular section having therebetween an open first end and extending along a vertical path on the downstream surface of said band;
    (d) said sleeve being so dimensional as to fit tightly around an elongated, buoyant weighted spar having a top end and a bottom end disposed in said tubular section;
    (e) wherein said spar positions said band in a generally vertical, partially submerged position when said boom is placed in the water, and wherein said spar is manually insertable and removable from said tubular section through said open first end.

2. The curtain section of claim 1 wherein said spar sleeve further comprises pivot means for pivotally attaching said tubular section and said contained spar to said band side, said pivot means permitting said sleeve to pivot relative to the surface of said band such that the spar sleeve and said spar contained therein align itself with the current adjacent the downstream surface of said band in response to water currents engaging said bands.

3. The curtain section of claim 2 wherein said pivot means includes a fabric neck between each of said marginal portions and said tubular portion, wherein said neck provides a fabric hinge for coupling said tubular section to said band.

4. The oil-containing boom of claim 1 wherein said tubular section has a second open end, said spar bottom end disposed below said tubular section.

5. The oil-containing boom of claim 4 wherein said tubular section extends substantially from said top edge to said bottom edge of said band.

6. The oil-containing boom of claim 1 further including locking means for securing said spar within said sleeve, said locking means including a pair of opposed tabs extending upwardly from the tubular section of said sleeve and a spar cap attachable to said top end of said spar, wherein the assembly of said spar cap over said tabs prevents inadvertent slippage of said spar within said sleeve.

7. The oil-containing boom of claim 6 wherein said tab is sandwiched between said spar cap and the upper end of said spar when said locking means is assembled.

8. A curtain section for an oil-containment boom comprising:
    (a) a water-permeable, oil-impermeable fabric band for confining oil to an area;
    (b) a series of tubular spar sleeves formed in spaced apart relationship adjacent the downstream surface of said band;
    (c) a plurality of elongated buoyant weighted spars disposed in respective said spar sleeves, each said spar having a top end and a bottom end; and
    (d) pivot means for movably connecting each said spar to said band for permitting the spar to pivot relative to the plane of said band such that said spar sleeve and a said spar contained therein can align itself with the current adjacent the downstream surface of the band in response to water currents engaging said band.

9. The curtain section of claim 8 wherein said spar has an oblong or oval cross-section.

10. The curtain section of claim 8 wherein the configuration of said spar receiving sleeve forms said pivot means, said spar receiving sleeve including a generally rectangular fabric having opposed side marginal portions and a central main portion, said side portions arranged in close proximity to each other to form attachment flanges, said flanges being seamed to said fabric band to form a tubular section therebetween extending along a vertical path on the downstream surface of said band, said spar being disposed within said tubular section, wherein said pivot means includes a fabric neck between each of said marginal portions and said tubular portion, wherein said neck provides a fabric hinge for coupling said tubular section to said band.

11. The oil-containing boom of claim 8 wherein said tubular section has an open top end so as to permit said spar to be manually inserted and removed from said sleeve during an oil-containment operation.

12. The oil-containing boom of claim 11 wherein said tubular section has an open bottom end, said spar bottom disposed below said tubular section.

13. The oil-containing boom of claim 12 wherein said sleeve extends substantially from a top edge to a bottom edge of said band.

14. The oil-containing boom of claim 10 wherein said spar and said tubular section are so shaped as to provide a close fit of the spar within said tubular section so as to secure said spar within said sleeve and so as to allow for manual insertion and removal of said spar during an oil containment operation.

15. The oil-containing boom of claim 8 further including locking means for securing said spar within said sleeve, said locking means including a pair of opposed tabs extending upwardly from the tubular section of said sleeve and a spar cap attachable to said top end of said spar, wherein the assembly of said spar cap over said tabs prevents inadvertent slippage of said spar within said sleeve.

16. The oil-containing boom of claim 15 wherein said tab is sandwiched between said spar cap and the upper end of said spar when said locking means is assembled.

* * * * *

UNITED STATES PATENT AND TRADEMARK OFFICE
CERTIFICATE OF CORRECTION

PATENT NO. : 5,267,813
DATED : December 7, 1993
INVENTOR(S) : James H. Neal, et. al.

It is certified that error appears in the above-indentified patent and that said Letters Patent is hereby corrected as shown below:

On the Title page, item [75], inventor: add Michael James Neal--.

Signed and Sealed this

Thirtieth Day of August, 1994

Attest:

BRUCE LEHMAN

Attesting Officer     Commissioner of Patents and Trademarks